(12) United States Patent
Forsythe

(10) Patent No.: US 10,630,869 B1
(45) Date of Patent: Apr. 21, 2020

(54) INDUSTRIAL PROCESS EVENT DETECTION USING MOTION ANALYSIS

(71) Applicant: Fortech, LLC, West Chester, OH (US)

(72) Inventor: Kent Charles Forsythe, Mason, OH (US)

(73) Assignee: Fortech, LLC, West Chester, OH (US)

( * ) Notice: Subject to any disclaimer, the term of this patent is extended or adjusted under 35 U.S.C. 154(b) by 0 days.

(21) Appl. No.: 16/031,394

(22) Filed: Jul. 10, 2018

Related U.S. Application Data

(60) Provisional application No. 62/532,104, filed on Jul. 13, 2017.

(51) Int. Cl.
*H04N 5/14* (2006.01)
*G06T 7/20* (2017.01)
*G05B 19/414* (2006.01)

(52) U.S. Cl.
CPC ........... *H04N 5/144* (2013.01); *G05B 19/414* (2013.01); *G06T 7/20* (2013.01)

(58) Field of Classification Search
None
See application file for complete search history.

(56) References Cited

U.S. PATENT DOCUMENTS

2002/0191952 A1* 12/2002 Fiore ......................... H04N 5/76
386/217
2018/0189943 A1* 7/2018 Fuse ...................... H04N 5/232

* cited by examiner

*Primary Examiner* — Hung Q Dang
(74) *Attorney, Agent, or Firm* — Wood Herron & Evans LLP

(57) ABSTRACT

Systems, methods, and computer program products for monitoring an industrial process. Motion related to the industrial process is monitored to identify the occurrence of events such as equipment stoppages and/or to characterize the process. Motion data may be extracted from a video of the industrial process. Based on an analysis of the motion data, a determination is made whether an event has occurred, such as an equipment malfunction, work stoppage, or another process anomaly. In response to determining an event has occurred, an error log may be generated and stored in a database. Analysis of the timing and amount of motion may be used to determine a root cause of the event and/or to count the number of products produced by the process being monitored.

20 Claims, 5 Drawing Sheets

# INDUSTRIAL PROCESS EVENT DETECTION USING MOTION ANALYSIS

CROSS-REFERENCE TO RELATED APPLICATIONS

This application claims the benefit of and priority to U.S. Application No. 62/532,104 filed Jul. 13, 2017, the disclosure of which is incorporated by reference herein in its entirety.

FIELD OF THE INVENTION

The invention generally relates to industrial automation and, more particularly, to systems, methods, and computer program products that detect and log events relating to an industrial process.

BACKGROUND OF THE INVENTION

Since the beginning of the industrial revolution, manufacturers have been concerned with reducing costs of production. Over time, manufactures have generally increased their use of machines and automation to reduce the cost of producing and distributing goods as new technologies have become available. However, as automated machines have assumed a greater role in manufacturing, their failures have had a correspondingly greater impact on production efficiency. Manufacturing costs related to industrial process failures in a modern factory can have a large effect on the overall cost of production. In particular, unplanned stoppages in production due to equipment failures, output blockages, and/or input starvation must be avoided to maintain efficiency.

In order to reduce the frequency and duration of unplanned stoppages, systems have been developed to detect stoppages and other events that reduce efficiency. Conventional process monitoring systems often connect to a Programmable Logic Controller (PLC) that controls the equipment being monitored. The PLC receives input signals from various sensors and/or switches related to the process being controlled, and generates one or more control signals based these input signals and/or a state of the PLC. The process monitoring systems receive and analyze data from the PLC, and attempt to identify certain predefined events that are indicative of a stoppage.

There are many different types of PLCs in use, with each type potentially having a different input/output addressing scheme, memory organization, and/or instruction set. Thus, process monitoring systems must often be individually configured to operate with the specific PLC being monitored. Even within the same type of PLC, different models may operate differently enough to require custom programming. Further adding to the difficulty in developing process monitoring systems, some industrial machines, and/or the PLCs that control them, lack a machine interface from which the process monitoring system can receive data. As a result of these difficulties, the operation of much of the equipment controlling production lines goes unmonitored, is unable to determine when the industrial process has stopped, and cannot log stoppages when they occur.

Thus, improved systems, methods, and computer program products are needed that monitor industrial processes without the need for specialized programming or a connection to the equipment used in the process.

SUMMARY OF THE INVENTION

In an embodiment of the invention, a method of monitoring an industrial process is presented. The method includes determining an amount of motion associated with the industrial process, comparing the determined amount of motion to a reference amount of motion, and in response to the determined amount of motion differing from the reference amount of motion by more than a predetermined amount, logging an event.

In another embodiment of the invention, a system for monitoring the industrial process is presented. The system includes one or more processors and memory containing program code. The program code is configured so that when it is executed by at least one of the one or more processors, it causes the system to determine the amount of motion associated with the industrial process, compare the determined amount of motion to the reference amount of motion, and in response to the determined amount of motion differing from the reference amount of motion by more than the predetermined amount, log the event.

In another embodiment of the invention, a computer program product for monitoring the industrial process is presented. The computer program product includes a non-transitory computer-readable storage medium and program code stored on the non-transitory computer-readable storage medium. The program code is configured to, when executed by the at least one of the one or more processors, cause the at least one of the one or more processors to determine the amount of motion associated with the industrial process, compare the determined amount of motion to the reference amount of motion, and in response to the determined amount of motion differing from the reference amount of motion by more than the predetermined amount, log the event.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to systems, methods, and computer program products that analyze motion of an industrial process to identify the occurrence of events such as equipment stoppages and/or to otherwise characterize the industrial process. To this end, motion data may be extracted from a video of the industrial process and analyzed. Based on this analysis, a determination is made whether an event has occurred, such as an equipment malfunction, work stoppage, or another process anomaly. In response to determining an event has occurred, an error log may be generated that identifies a portion of the video file associated with the event. Analysis of the timing and amount of motion in the video may be used to determine root causes of events and/or to count the number of products produced by the process being monitored.

Figure 1:
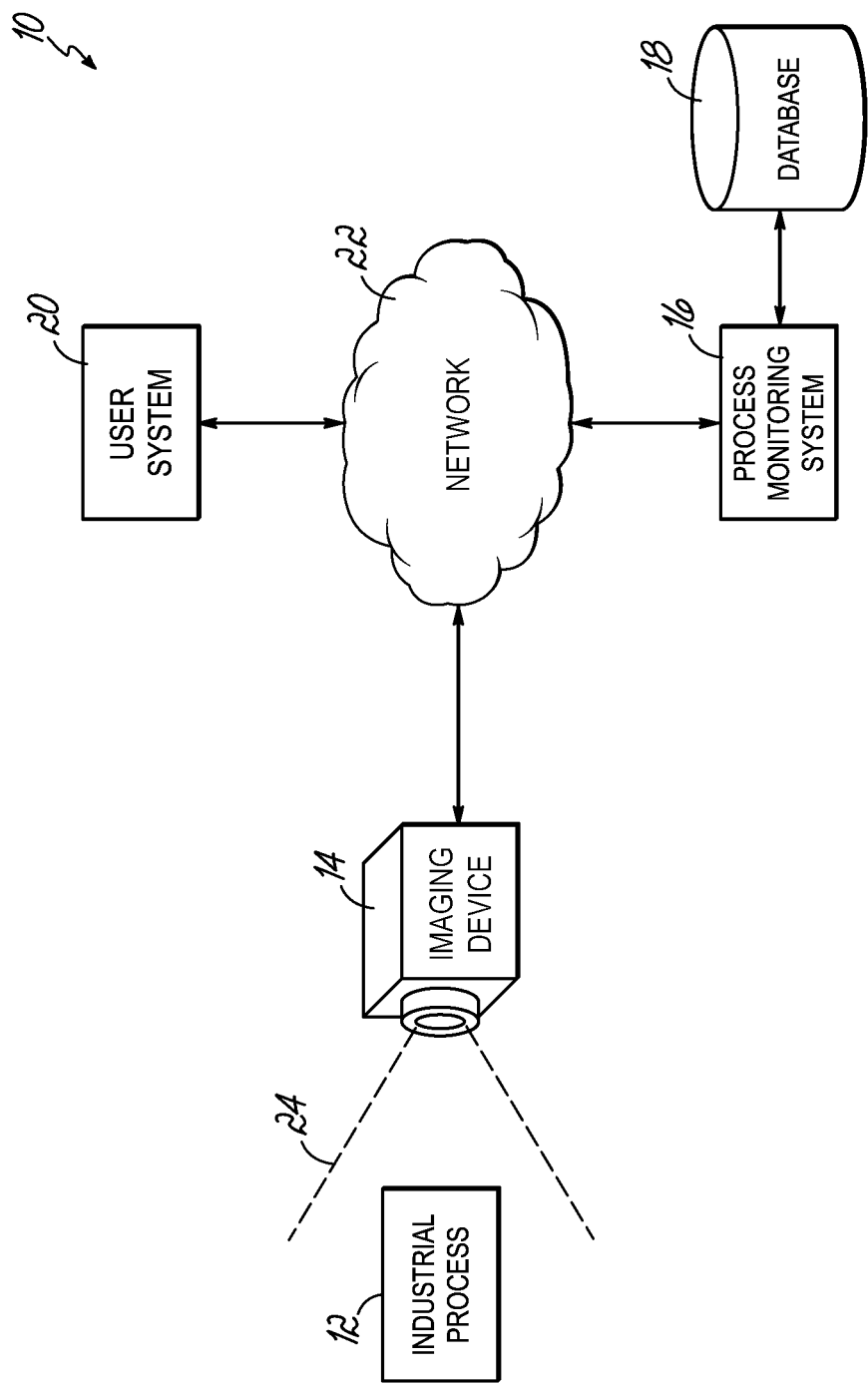
FIG. 1 is a schematic view of an operating environment including an industrial process, an imaging device, a user system, a process monitoring system, and a database in communication over a network.

Referring now to the figures, FIG. 1 depicts an exemplary operating environment 10 in accordance with an embodiment of the invention. The operating environment 10 may include an industrial process 12, an imaging device 14 configured to capture a sequence of images (e.g., video) related to the industrial process 12, a process monitoring system 16, a database 18, and a user system 20. The imaging device 14, process monitoring system 16, database 18, and user system 20 may be in communication over a network 22. The network 22 may include one or more private or public networks (e.g., the Internet, Local Access Networks (LANs), Wi-Fi hotspots, cellular carriers, etc.) that enable the exchange of data between the imaging device 14, process monitoring system 16, database 18, and user system 20.

The industrial process 12 may be any process exhibiting behavior that can be predicted based on observation, experience, or scientific principles. Exemplary processes may include, but are not limited to, operation of a conveyor belt system, an industrial robot, a Computer Numerical Control (CNC) machine, an assembly line, a welding machine, a packaging machine, or any other industrial process that involves movement or some other detectable and predictable behavior.

The imaging device 14 may be configured to receive electromagnetic energy in the form of light reflected from or emitted by the industrial process 12. The electromagnetic energy received by the imaging device 14 may be in the visible spectrum (e.g., 390 to 700 nm) or some other portion of the electromagnetic spectrum from which an image can be generated, e.g., infrared, microwave, ultraviolet, x-ray, etc. To this end, the imaging device 14 may include a device (e.g., a lens) that focuses electromagnetic energy received from within a field of view 24 onto a sensor that converts the resulting image into an electronic signal. The imaging device 14 may capture a sequence of images and transmit the corresponding electronic signals to the process monitoring system 16. The signals may be transmitted to the process monitoring system 16 in the form of video data using a direct link or over the network 22.

By way of example, the imaging device 14 may be an Internet Protocol (IP) camera or webcam that transmits video data to the process monitoring system 16 in the form of streaming media, such as a Moving Picture Experts Group (MPEG) video signal. In an alternative embodiment of the invention, the imaging device 14 may form an image using a form of energy other than electromagnetic energy, such as acoustic energy. In another alternative embodiment of the invention, the imaging device 14 may be replaced with a motion detector that generates a signal indicative of an amount of motion within the field of view 24. In this alternative embodiment, the process monitoring system 16 may process the received signal without having to extract the amount of motion from video data.

The process monitoring system 16 may store at least a portion of the video data received from the imaging device 14 in the database 18. Data stored in the database 18 may include images, video files, and/or event logs. The event logs may include one or more time-stamped events that are each associated with an image, set of images, or portion of a video file corresponding to the event. The process monitoring system 16 may include a database management server, and may generate an event log each time an event is detected. The database management server may be used to manage data stored in records of the database 18, and may retrieve data from the database 18 in response to a query, such as from the user system 20. The query may be dynamically determined and executed by an operating system, an application, and/or one or more modules resident on the system querying the database management server.

The database 18 may be used to collect and organize data used by the various systems and modules described herein. The database 18 may include data and supporting data structures that store and organize the data. In particular, the database 18 may be arranged with any database organization and/or structure including, but not limited to, a relational database, a hierarchical database, a network database, an object-oriented database, or combinations thereof.

The user system 20 may be a smart phone, tablet computer, laptop computer, desktop computer, or other computing device. The user system 20 may host a client application (e.g., a web browser application) that can be used to access the database management server of process monitoring system 16.

Figure 2:
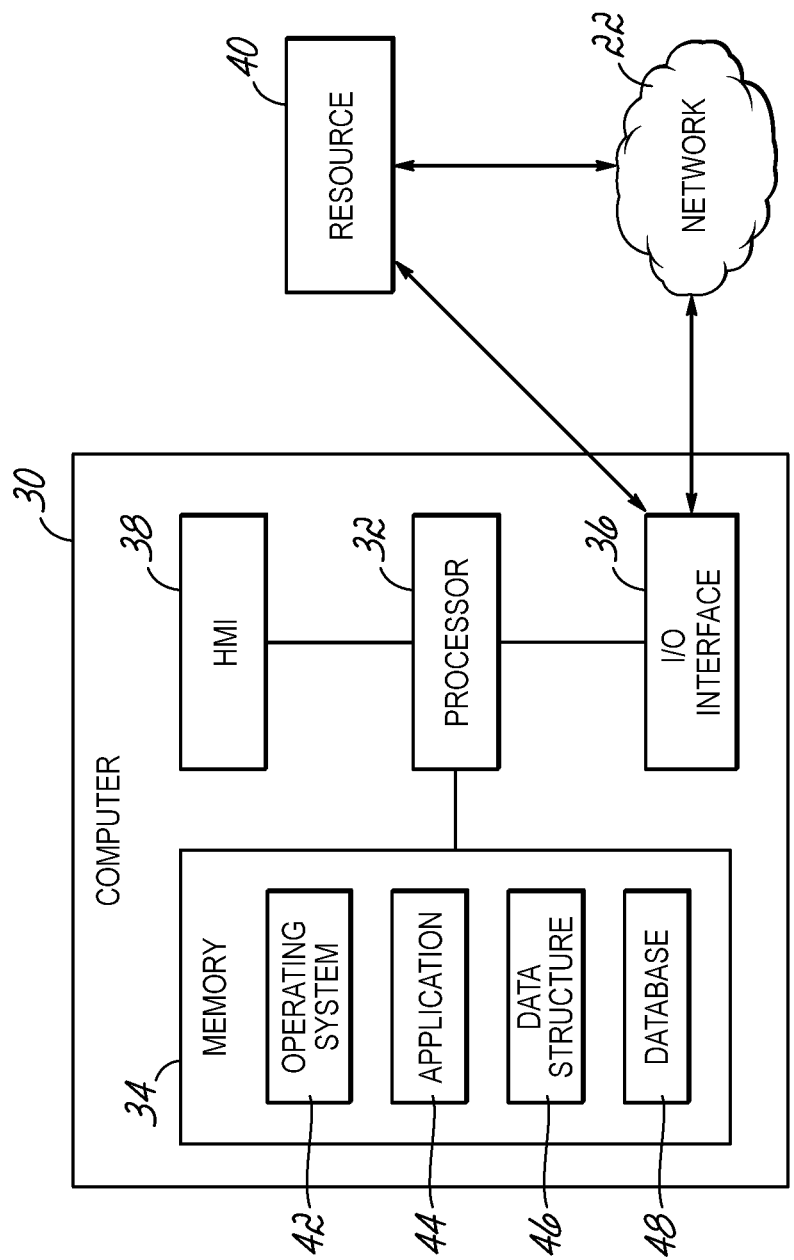
FIG. 2 a schematic view of an exemplary computing system that may be used to implement one or more of the user system, process monitoring system, database, and network of FIG. 1.

Referring now to FIG. 2, the process monitoring system 16, database 18, user system 20, and/or network 22 of operating environment 10 may be implemented on one or more computer devices or systems, such as exemplary computer 30. Computer 30 may include a processor 32, a memory 34, an input/output (I/O) interface 36, and a Human Machine Interface (HMI) 38. Computer 30 may also be operatively coupled to one or more external resources 40 via the network 22 and/or I/O interface 36. External resources may include, but are not limited to, servers, databases, mass storage devices, peripheral devices, cloud-based network services, or any other suitable computer resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, hard drives, optical drives, tape drives, volatile or non-volatile solid state devices, or any other devices capable of storing information.

The processor 32 may operate under the control of an operating system 42 that resides in memory 34. The operating system 42 may manage computer resources so that computer program code embodied as one or more computer software applications, such as an application 44 residing in memory 34, may have instructions executed by the processor 32. The processor 32 may also execute the application 44 directly, in which case the operating system 42 may be omitted. The one or more computer software applications may include a running instance of an application comprising a server, which may accept requests from, and provide responses to, one or more corresponding client applications. One or more data structures 46 may also reside in memory 34, and may be used by the processor 32, operating system 42, and/or application 44 to store and/or manipulate data.

The I/O interface 36 may provide a machine interface that operatively couples the processor 32 to other devices and systems, such as the network 22 or external resource 40. The application 44 may thereby work cooperatively with the network 22 or external resource 40 by communicating via the I/O interface 36 to provide the various features, functions, applications, processes, or modules comprising embodiments of the invention. The application 44 may also have program code that is executed by one or more external resources 40, or otherwise rely on functions or signals provided by other system or network components external to the computer 30. Indeed, given the nearly endless hardware and software configurations possible, it should be understood that embodiments of the invention may include applications that are located externally to the computer 30, distributed among multiple computers or other external resources 40, or provided by computing resources (hardware and software) that are provided as a service over the network 22, such as a cloud computing service.

The HMI 38 may be operatively coupled to the processor 32 of computer 30 to enable a user to interact directly with the computer 30. The HMI 38 may include video or alphanumeric displays, a touch screen, a speaker, and any other suitable audio and visual indicators capable of providing data to the user. The HMI 38 may also include input devices and controls such as an alphanumeric keyboard, a pointing device, keypads, pushbuttons, control knobs, microphones, etc., capable of accepting commands or input from the user and transmitting the entered input to the processor 32.

A database 48 may reside in memory 34, and may be used to collect and organize data used by the various systems and modules described herein. The database 48 may include data and supporting data structures that store and organize the data. In particular, the database 48 may be arranged with any database organization or structure including, but not limited to, a relational database, a hierarchical database, a network database, an object-oriented database, or combinations thereof.

A database management system in the form of a computer software application executing as instructions on the processor 32 may be used to access the information or data stored in records of the database 48 in response to a query, where a query may be dynamically determined and executed by the operating system 42, other applications 44, or one or more modules. Although embodiments of the invention may be described herein using relational, hierarchical, network, object-oriented, or other database terminology in specific instances, it should be understood that embodiments of the invention may use any suitable database management model, and are not limited to any particular type of database.

Figure 3:
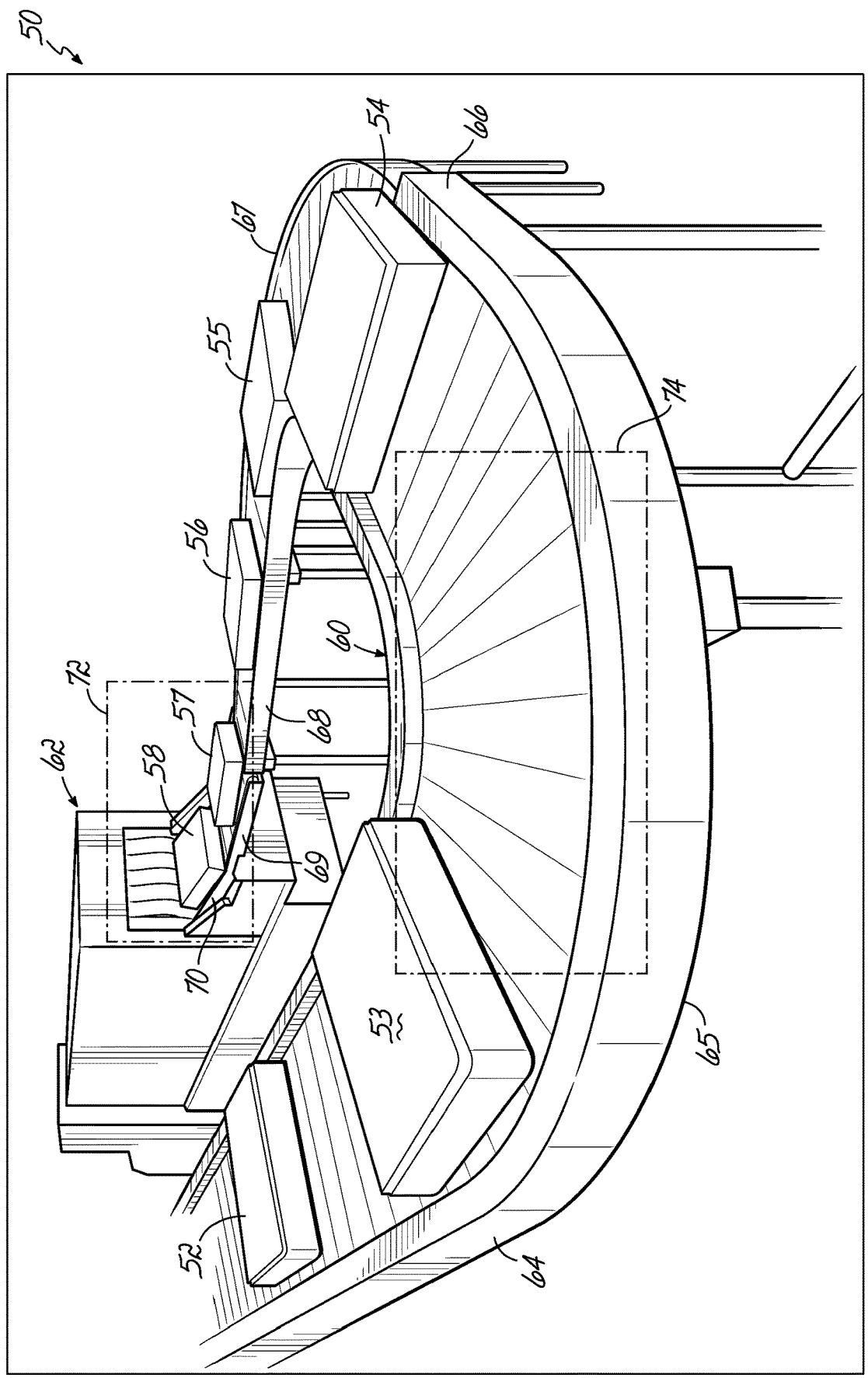
FIG. 3 is a diagrammatic view of an exemplary image that may be captured and analyzed by the process monitoring system of FIG. 1.

FIG. 3 depicts an image 50 of an exemplary industrial process 12 that may represent one of a sequence of images (e.g., video frames) captured by the imaging device 14. The image 50 includes a plurality of objects 52-58 (e.g., totes of dishes) that are being transported by a conveyor 60 to a processing area 62 (e.g., a dish washing machine). The conveyor 60 may include one or more sections 64-70 that are configured to control the movement and grouping of the objects 52-58. The sections 64-70 may include straight sections 64, 66, 69, curved sections 65, 67, a decline section 68, and an incline section 70.

Certain areas of the image 50 may produce motion data that has a higher signal to noise ratio, is more consistent, or covers a portion of the process that has a higher likelihood of being a root cause of an event than other areas of the image 50. To take advantage of this, embodiments of the invention may define zones within the image 50 that isolate these areas, and generate motion data using these zones rather than the entire image 50. The use of zones may improve the sensitivity and reliability of event detection, as well as reduce the number of false triggers as compared to systems lacking this feature.

For example, movement of the objects 52-58 near an intake of the processing area 62 may be more consistent over time than movement on other parts of the conveyor 60. To take advantage of this characteristic of the industrial process 12, a zone 72 may be defined to isolate this area of image 50. In some cases, more than one zone may be defined within an image to focus the analysis on those areas that are most likely to produce good motion data or in which the root cause of an event is more likely to occur. By way of example, another zone 74 may be defined that covers curved section 65 of conveyor 60 due to a known propensity of objects 52-58 to become jammed while traversing this section. Zones may be monitored separately for events, or may be processed collectively to determine when a process-wide event occurs and/or to identify the type of event.

The process monitoring system 16 may include a motion detection algorithm that analyzes changes in each zone 72, 74 of the image between frames. Based on this analysis, the motion detection algorithm may generate a motion parameter having a numerical value that quantifies the amount of motion within the zone. For example, the motion detection algorithm may compare each incoming frame to a stored reference frame, and generate the motion parameter based on differences between the frames. The reference frame may be the frame immediately preceding the current frame (e.g., when comparing consecutive images), or a frame generated based on the preceding frame and/or one or more other frames. Methods of comparing frames may include comparing the luminance value of one or more pixels or groups of pixels within the zone of the current frame to a corresponding group of one or more pixels within the zone of the reference frame, and generating the motion parameter based on the differences. Other methods of generating the motion parameter may include extracting edges from the current and reference frames, and determining changes in the location of the edges between the frames. Methods of detecting and quantifying motion in a video signal are disclosed by U.S. Pat. No. 6,493,041, which is incorporated by reference herein in its entirety.

Figure 4:
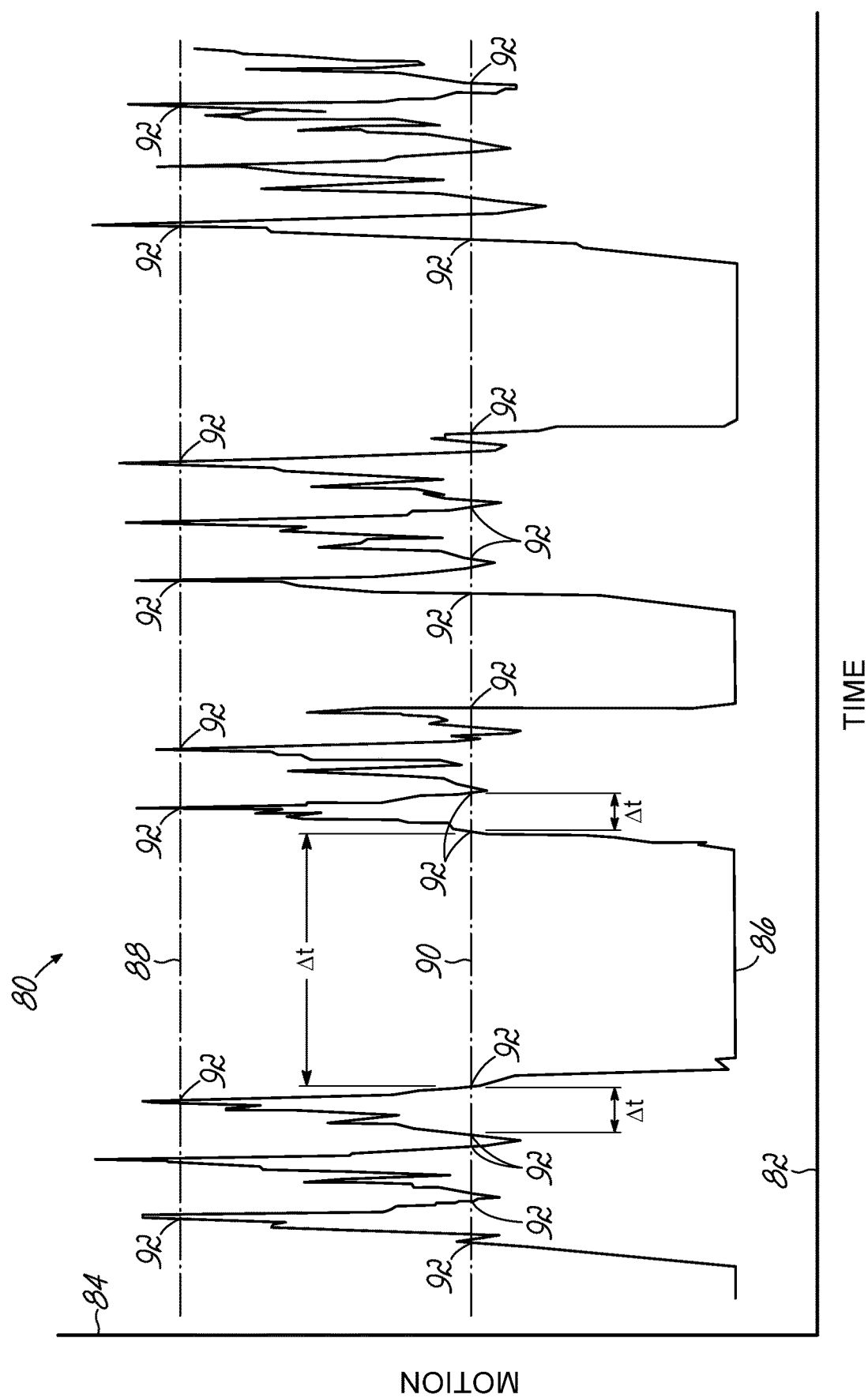
FIG. 4 is a graphical view of a plot depicting an exemplary motion profile that may be determined by the process monitoring system of FIG. 1.

Referring now to FIG. 4, and for purposes of illustration only, an exemplary graph 80 includes a horizontal axis 82 corresponding to time, a vertical axis 84 corresponding to the motion parameter, and a plot 86 of a motion profile representing the value of the motion parameter with respect to time, e.g., for a video segment. In an embodiment of the invention, the values of the motion parameters received or generated by the process monitoring system 16 may be normalized so that a maximum possible amount of motion detected has a value of unity, and a minimum possible amount of motion detected (e.g., no motion) has a value of zero. Each point of plot 86 may provide the value of the motion parameter corresponding to a point in time or a frame of a video signal identified by the horizontal axis. The value of the motion parameter may reflect the amount of motion detected in the frame of the video segment identified by the horizontal axis as compared to the previous adjacent frame. By way of example only, values of the peak amounts of motion indicated by plot 86 for a typical industrial process 12 may be in the range of 0.25 to 0.30 on a normalized scale, and values of the minimum amounts of motion indicated by plot 86 may be in a range of 0.00 to 0.05 on a normalized scale.

An upper boundary 88 and a lower boundary 90 may be used to define points of interest 92 at each point where the plot 86 crosses a respective boundary. Based on the amounts of time Δt between the points of interest 92, the process monitoring system 16 may define one or more motion signatures indicative of normal operation of the industrial process 12 and/or various events that indicate abnormal operation of the industrial process 12, e.g., a stoppage. During normal operation, the points of interest may be used by the process monitoring system 16 to count the number of products being produced. If the time between points of interest falls outside an allowable range (e.g., is greater than 1 to 5 seconds), it may indicate that the industrial process 12 has stopped operating or is not operating properly. Thus, the process monitoring system 16 may use the points of interest to distinguish between movement associated with normal operation of the industrial process 12 and abnormal operation that indicates products have stopped moving or that equipment has stopped operating.

The process monitoring system 16 may be used to generate a library of reference profiles and/or reference signatures in the database 18 based on historical data collected from the industrial process 12. Comparisons may be made between current motion profiles and/or signatures (e.g., points of interest and the timing thereof) and reference profiles and/or signatures stored in the database 18 to identify specific events or root causes of process failures. By way of example, a jam in a conveyor system caused by a box having a flap that is not glued down may produce a distinctive motion signature (e.g., a distinctively shaped motion profile and/or set of times between points of interest). The process monitoring system 16 may identify a loose box flap as the root cause of a stoppage based on the motion signature of a current event matching the reference signature of a previous event known to have this root cause.

Figure 5:
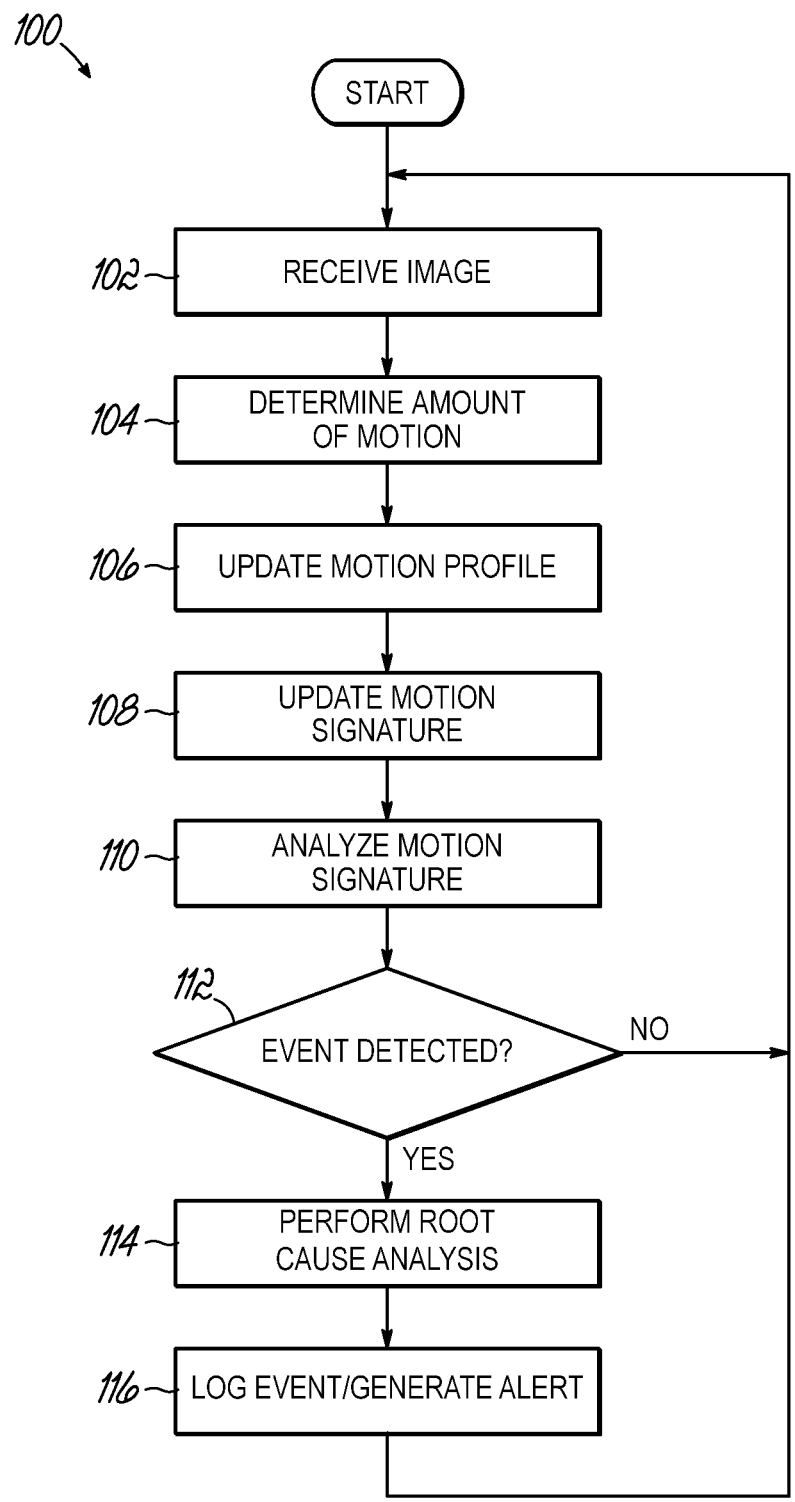
FIG. 5 is a flowchart illustrating a monitoring process for analyzing motion data to detect and log events that may be executed by the process monitoring system of FIG. 1.

FIG. 5 depicts a flowchart illustrating a monitoring process 100 that may be implemented by process monitoring system 16 or any other suitable computer of operating environment 10. In block 102, the monitoring process 100 receives an image. The image may be one of a chronological sequence of images extracted from video data. The video data may comprise, for example, a video signal received from the imaging device 14 or a video file stored in the database 18. In response to receiving the image, the monitoring process 100 may proceed to block 104 and determine an amount of motion for the image. Determining the amount of motion may include comparing the image to a reference image. The reference image may be an immediately preceding image in the video data, an image generated based on one or more images extracted from the video data, or any other image suitable for determining the amount of motion of the received image. The monitoring process 100 may quantify the determined amount of motion as a numeric value, with higher numeric values indicating greater amounts of motion.

Once the amount of motion has been determined, the monitoring process 100 may proceed to block 106 and update the motion profile for the video data being analyzed. Updating the motion profile may include adding an element that defines the determined amount of motion (e.g., data indicative of the numeric value quantifying the motion) to a motion profile data structure. The motion profile data structure may be an array of elements that define the amount of motion for each consecutive image in a sequence of images extracted from the video data. The sequence of images may comprise, for example, a group of video frames within a moving window of time that includes the time the received image was captured. Each element in the array may include data indicative of the time the image for which the amount of motion was determined was captured. The motion profile may thereby define the determined amount of motion verses time for the chronological sequence of images. In an alternative embodiment of the invention, the motion profile may be generated using a signal from a motion detection sensor indicative of an amount of motion of the industrial process 12 rather than motion parameters extracted from video data.

In block 108, the monitoring process 100 may update the motion signature based on the updated motion profile. Updating the motion signature may include determining points in time where the motion profile crosses one or more threshold values, and adding elements to a motion signature data structure that characterize these points of interest. For example, each element in the motion signature data structure may include data that defines the threshold crossed (e.g., upper or lower threshold), the time the threshold was crossed, and the direction of the crossing (e.g., positive or negative).

Once the motion signature has been updated, the monitoring process 100 may proceed to block 110 and analyze the motion signature. This analysis may include determining amounts of time between points of interest, and comparing these amounts of time to one or more reference signatures associated with a normal mode of operation. For example, the time between a pair of adjacent points of interest (e.g., a positive crossing of an upper threshold and a subsequent negative crossing of the upper threshold) may indicate a period of time having a relatively high amount of motion. In contrast, the time between a pair of adjacent points of interest comprising a negative crossing of a lower threshold and a subsequent positive crossing of the lower threshold may indicate a period of time having a relatively low amount of motion. The motion signature may thereby define one or more sequential periods each having a duration and an amount of motion associated therewith.

In block 112, the monitoring process 100 may determine if an event has occurred based on the above analysis of the motion signature. If the duration and amount of motion in each period defined by the motion signature falls within normal ranges of duration and movement (e.g., the motion signature matches a reference signature associated with normal operation of the industrial process 12), monitoring process 100 may determine that an event has not occurred ("NO" branch of decision block 112), return to block 102, and continue analyzing the video data. If the duration and amount of motion in one or more periods defined by the motion signature falls outside normal ranges of duration and movement (e.g., the motion signature does not match any reference signatures associated with normal operation of the industrial process 12), monitoring process 100 may determine that an event has occurred ("YES" branch of decision block 112) and proceed to block 114.

In block 114, the monitoring process 100 may perform a root cause analysis of the detected event. To this end, the sequence of periods of movement defined by the motion signature may be compared to one or more reference signatures each comprising a sequence of periods that corresponds to a known type of event associated with the industrial process 12. These reference signatures may be generated, for example, using historical motion data of the industrial process 12 covering a period of time when the type of event in question occurred, and the generated reference signature stored in the database 18. The database 18 may include a library comprising different sets of reference signatures and/or reference profiles, with each set being associated with a different type of industrial process 12. Thus, the monitoring process 100 may analyze different industrial processes 12 or portions thereof by selecting a set of reference signatures and/or reference profiles from the library that corresponds to the process in question.

Comparing the motion signature to the reference signatures may include, for example, performing a correlation between the motion signature and one or more reference signatures. The monitoring process 100 may then select the reference signature with the highest level of correlation as the reference signature having the closest match to the motion signature. In an alternative embodiment of the invention, the monitoring process 100 may compare profiles rather than signatures, e.g., by performing a correlation between the motion profile and a reference profile.

The monitoring process 100 may proceed to block 116 and log the event in the database 18 and/or generate an alert. The event log may include a time stamp, data identifying the type of event detected by the root cause analysis, and data that identifies the point in the video where the event was detected. The error log may facilitate finding and viewing the portion of the video file surrounding the event so that a user can verify the root cause or otherwise analyze the event.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, web based services, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of monitoring an industrial process, the method comprising:
    determining, sequentially over a first period of time, a plurality of determined amounts of motion associated with the industrial process;
    generating a motion profile that defines a relationship between each determined amount of motion and a time the determined amount of motion occurs;
    identifying each point in time the motion profile crosses a threshold as a point of interest;
    determining one or more first amounts of time between one or more pairs of adjacent points of interest;
    comparing the one or more first amounts of time to one or more second amounts of time associated with an allowable range of time; and
    in response to at least one of the one or more first amounts of time differing from at least one of the one or more second amounts of time by more than a predetermined amount, logging an event.

2. The method of claim 1 wherein determining the amounts of motion comprises:
    receiving a sequence of images related to the industrial process; and
    determining the amounts of motion based on the sequence of images.

3. The method of claim 2 wherein determining the amounts of motion based on the sequence of images comprises:
    comparing two or more images in the sequence of images; and
    determining each amount of motion based on differences between the two or more images.

4. The method of claim 3 wherein comparing the two or more images comprises comparing a zone of each image.

5. The method of claim 1 wherein comparing the one or more first amounts of time to the one or more second amounts of time comprises:
    generating a reference profile that defines a relationship between each of a plurality of reference amounts of motion and the time the reference amount of motion occurs.

6. The method of claim 5 wherein each point in time the motion profile crosses the threshold is a first point of interest, and the one or more second amounts of time are determined by:
    identifying each point in time the reference profile crosses the threshold as a second point of interest; and
    determining the one or more second amounts of time as the amount of time between one or more pairs of adjacent second points of interest.

7. The method of claim 5 wherein the plurality of determined amounts of motion is a first plurality of determined amounts of motion, further comprising:
    determining a motion signature for the first plurality of determined amounts of motion;
    determining a reference signature for a second plurality of determined amounts of motion; and
    comparing the motion signature to the reference signature.

8. The method of claim 7 wherein the reference signature is one of a plurality of reference signatures each corresponding to a type of event, and further comprising:
    comparing the motion signature to each of the reference signatures; and
    determining the type of event based on which of the reference signatures provides a closest match to the motion signature.

9. The method of claim 7 wherein comparing the motion signature to the reference signature comprises:
    determining a level of correlation between at least a portion of the motion signature and at least a portion of the reference signature,
    wherein the determined amount of motion differs from the reference amount of motion by more than the predetermined amount if the level of correlation is below a correlation threshold.

10. The method of claim 1 wherein the threshold is one of a plurality of thresholds including a first threshold and a second threshold, and determining the one or more first amounts of time between the one or more pairs of adjacent points of interest comprises:
    identifying each point in time the motion profile crosses the first threshold as a first point of interest;
    identifying each point in time the motion profile crosses the second threshold as a second point of interest; and
    determining the one or more first amounts of time as one or more of the time between one or more pairs of adjacent first points of interest, the time between one or more pairs of adjacent first and second points of interest, or the time between one or more pairs of adjacent second points of interest.

11. The method of claim 10 wherein comparing the one or more first amounts of time to the one or more second amounts of time comprises:
    identifying each point in time a reference profile crosses the first threshold as a third point of interest;
    identifying each point in time the reference profile crosses the second threshold as a fourth point of interest; and
    determining the one or more second amounts of time as one of the time between one or more pairs of adjacent third points of interest, the time between one or more pairs of adjacent third and fourth points of interest, or the time between one or more pairs of adjacent fourth points of interest.

12. The method of claim 11 wherein the first threshold is an upper threshold, and the second threshold is a lower threshold.

13. A system for monitoring an industrial process, the system comprising:
    one or more processors; and
    memory containing program code that, when executed by at least one of the one or more processors, causes the system to:

determine, sequentially over a first period of time, a plurality of determined amounts of motion associated with the industrial process;

generate a motion profile that defines a relationship between each determined amount of motion and a time the determined amount of motion occurs;

identify each point in time the motion profile crosses a threshold as a point of interest;

determine one or more first amounts of time between one or more pairs of adjacent points of interest;

compare the one or more first amounts of time to one or more second amounts of time associated with an allowable range of time; and in response to at least one of the one or more first amounts of time differing from at least one of the one or more second amounts of time by more than a predetermined amount, log an event.

14. The system of claim 13 wherein the program code causes the system to determine the amounts of motion by:
receiving a sequence of images related to the industrial process; and
determining the amounts of motion based on the sequence of images.

15. The system of claim 13 wherein the program code causes the system to compare the one or more first amounts of time to the one or more second amounts of time by:
generating a reference profile that defines a relationship between each of a plurality of reference amounts of motion and the time the reference amount of motion occurs.

16. The system of claim 15 wherein the plurality of determined amounts of motion is a first plurality of determined amounts of motion, and the program code further causes the system to:
determine a motion signature for the first plurality of determined amounts of motion;
determine a reference signature for a second plurality of determined amounts of motion; and
compare the motion signature to the reference signature.

17. The system of claim 16 wherein the reference signature is one of a plurality of reference signatures each corresponding to a type of event, and the program code further causes the system to:
compare the motion signature to each of the reference signatures; and
determine the type of event based on which of the reference signatures provides a closest match to the motion signature.

18. The system of claim 13 wherein the threshold is one of a plurality of thresholds including a first threshold and a second threshold, and the program code causes the system to determine the one or more first amounts of time between the one or more pairs of adjacent points of interest by:
identifying each point in time the motion profile crosses the first threshold as a first point of interest;
identifying each point in time the motion profile crosses the second threshold as a second point of interest; and
determining the one or more first amounts of time as one or more of the time between one or more pairs of adjacent first points of interest, the time between one or more pairs of adjacent first and second points of interest, or the time between one or more pairs of adjacent second points of interest.

19. The system of claim 18 wherein the program code causes the system to compare the one or more first amounts of time to the one or more second amounts of time by:
identifying each point in time a reference profile crosses the first threshold as a third point of interest;
identifying each point in time the reference profile crosses the second threshold as a fourth point of interest; and
determining the one or more second amounts of time as one of the time between one or more pairs of adjacent third points of interest, the time between one or more pairs of adjacent third and fourth points of interest, or the time between one or more pairs of adjacent fourth points of interest.

20. A computer program product for monitoring an industrial process, the computer program product comprising:
a non-transitory computer-readable storage medium; and
program code stored on the non-transitory computer-readable storage medium that, when executed by one or more processors, causes the one or more processors to:
determine, sequentially over a first period of time, a plurality of determined amounts of motion associated with the industrial process;
generate a motion profile that defines a relationship between each determined amount of motion and a time the determined amount of motion occurs;
identify each point in time the motion profile crosses a threshold as a point of interest;
determine one or more first amounts of time between one or more pairs of adjacent points of interest;
compare the one or more first amounts of time to one or more second amounts of time associated with an allowable range of time; and
in response to at least one of the determined one or more first amounts of time differing from at least one of the one or more second amounts of time by more than a predetermined amount, log an event.

* * * * *